US012682132B2

(12) United States Patent
Jung et al.

(10) Patent No.: US 12,682,132 B2
(45) Date of Patent: Jul. 14, 2026

(54) APPARATUS, METHOD AND PROGRAM FOR AUTOMATICALLY DESIGNING EQUIPMENT LINES IN BIM DESIGN DATA

(71) Applicant: SLZ Inc., Siheung-si (KR)

(72) Inventors: Jae Heon Jung, Seoul (KR); Yu Mi Lee, Incheon (KR)

(73) Assignee: SLZ Inc., Siheung-si (KR)

( * ) Notice: Subject to any disclaimer, the term of this patent is extended or adjusted under 35 U.S.C. 154(b) by 1157 days.

(21) Appl. No.: 17/532,650

(22) Filed: Nov. 22, 2021

(65) Prior Publication Data

US 2022/0405436 A1 Dec. 22, 2022

(30) Foreign Application Priority Data

Jun. 21, 2021 (KR) ........................ 10-2021-0080395

(51) Int. Cl.
*G06F 30/18* (2020.01)
*G01C 11/36* (2006.01)
(Continued)

(52) U.S. Cl.
CPC .............. *G06F 30/18* (2020.01); *G01C 11/36* (2021.08); *G01S 17/89* (2013.01); *G06F 3/017* (2013.01);
(Continued)

(58) Field of Classification Search
CPC ...... G06F 30/18; G06F 30/12; G06F 2119/22; G06F 30/13; G06F 2113/14; G06F 2113/16; G06F 3/017; G06F 2111/18;

G06F 2111/20; G06F 16/901; G01C 11/36; G01S 17/89; G06Q 50/08; G06T 17/20; G06T 19/006; G06T 7/70; G06T 2207/20081;
(Continued)

(56) References Cited

U.S. PATENT DOCUMENTS 5,557,537 A * 9/1996 Normann ................ G06F 30/13
703/1
5,740,341 A * 4/1998 Oota ...................... G06Q 10/06
345/420
(Continued)

FOREIGN PATENT DOCUMENTS

EP 1223520 A2 * 7/2002 ............. G06F 30/13
KR 10-2019-0063317 A 6/2019
(Continued)

OTHER PUBLICATIONS

Alizadehsalehi, Sepehr, Ahmad Hadavi, and Joseph Chuenhuei Huang. "From BIM to extended reality in AEC industry." Automation in construction 116 (2020): 103254 (Year: 2020).*
(Continued)

*Primary Examiner* — Renee D Chavez
*Assistant Examiner* — Anthony Chavez
(74) *Attorney, Agent, or Firm* — Studebaker Brackett PLLC

(57) ABSTRACT

The present disclosure relates to an apparatus for automatically designing an equipment line in BIM design data. When a plurality of pieces of equipment line installation data including a start point and an end point for equipment line installation in a construction site is input, an equipment line is automatically designed in the BIM design data based thereon.

17 Claims, 9 Drawing Sheets

(51) Int. Cl.

| | |
|---|---|
| *G01S 17/89* | (2020.01) |
| *G06F 3/01* | (2006.01) |
| *G06F 30/12* | (2020.01) |
| *G06F 30/13* | (2020.01) |
| *G06Q 50/08* | (2012.01) |
| *G06T 17/20* | (2006.01) |
| *G06T 19/00* | (2011.01) |
| *G08B 21/18* | (2006.01) |
| *G02B 26/10* | (2006.01) |
| *G02B 27/00* | (2006.01) |
| *G02B 27/01* | (2006.01) |
| *G06F 111/18* | (2020.01) |
| *G06F 111/20* | (2020.01) |
| *G06F 113/14* | (2020.01) |
| *G06F 113/16* | (2020.01) |
| *G06T 7/70* | (2017.01) |
| *G06T 17/00* | (2006.01) |

(52) U.S. Cl.
CPC .............. *G06F 30/12* (2020.01); *G06F 30/13* (2020.01); *G06Q 50/08* (2013.01); *G06T 17/20* (2013.01); *G06T 19/006* (2013.01); *G08B 21/182* (2013.01); *G02B 26/10* (2013.01); *G02B 27/0093* (2013.01); *G02B 27/01* (2013.01); *G02B 2027/014* (2013.01); *G02B 27/017* (2013.01); *G06F 2111/18* (2020.01); *G06F 2111/20* (2020.01); *G06F 2113/14* (2020.01); *G06F 2113/16* (2020.01); *G06T 7/70* (2017.01); *G06T 17/00* (2013.01); *G06T 2207/20081* (2013.01)

(58) Field of Classification Search
CPC .... G06T 17/00; G08B 21/182; G02B 27/017; G02B 2027/014; G02B 27/0093; G02B 27/01; G02B 26/10; H04W 4/02
See application file for complete search history.

(56) References Cited

U.S. PATENT DOCUMENTS

| | | | | |
|---|---|---|---|---|
| 5,755,072 | A * | 5/1998 | Lingafelter | E04G 21/18 |
| | | | | 52/741.1 |
| 9,335,545 | B2 * | 5/2016 | Johnson | E02F 9/261 |
| 10,706,185 | B2 * | 7/2020 | Tang | G06F 30/13 |
| 10,949,805 | B2 * | 3/2021 | Glunz | G06F 30/13 |
| 11,188,686 | B2 * | 11/2021 | Duff | G06F 30/13 |
| 11,270,426 | B2 * | 3/2022 | Salgian | G06T 7/0004 |
| 11,303,795 | B2 * | 4/2022 | Zass | G06Q 50/08 |
| 12,223,472 | B2 * | 2/2025 | Jung | G06T 19/20 |
| 12,314,464 | B1 * | 5/2025 | Jung | G06F 3/017 |
| 2009/0326876 | A1 * | 12/2009 | Miller | G06F 30/00 |
| | | | | 703/1 |
| 2019/0073827 | A1 * | 3/2019 | Coronado | G06T 19/006 |
| 2019/0354075 | A1 * | 11/2019 | Christiansen | G05B 15/02 |
| 2019/0362544 | A1 * | 11/2019 | Pekelny | G06T 15/08 |
| 2020/0065433 | A1 * | 2/2020 | Duff | G01S 5/02 |
| 2020/0319455 | A1 * | 10/2020 | Cummings | H04N 23/69 |
| 2021/0073436 | A1 * | 3/2021 | Duff | G02B 27/0093 |
| 2024/0242323 | A1 * | 7/2024 | Jung | G06T 19/006 |
| 2024/0411949 | A1 * | 12/2024 | Jung | G06F 30/12 |

FOREIGN PATENT DOCUMENTS

| | | |
|---|---|---|
| KR | 10-2019-0094788 A | 8/2019 |
| KR | 10-2043278 B1 | 11/2019 |
| KR | 102056320 B1 * | 12/2019 |

OTHER PUBLICATIONS

Wu, Shaoze, Lei Hou, and Guomin Zhang. "Integrated application of BIM and extended reality technology: a review, classification and outlook." International Conference on Computing in Civil and Building Engineering. Cham: Springer International Publishing, 2020 (Year: 2020).*

An Office Action mailed by the Korean Intellectual Property Office on Sep. 14, 2022, which corresponds to Korean Patent Application No. 10-2021-0080395 and is related to U.S. Appl. No. 17/532,650.

* cited by examiner

10

PROVIDE BIM DESIGN DATA, INTERNAL STRUCTURE DATA OF CONSTRUCTION SITE, AND EQUIPMENT DATA ——— S110

RECEIVE A PLURALITY OF PIECES OF EQUIPMENT LINE INSTALLATION DATA ——— S130

AUTOMATICALLY DESIGN EQUIPMENT LINE ——— S150

CONSTRUCTION SUPERVISION ASSITANCE APPARATUS (300)

CAMERA (350)

TRANSPARENT DISPLAY UNIT (360)

PROCESSOR (310)

COMMUNICATION UNIT (320)

DATABASE (330)

LIDAR (340)

FIG. 6

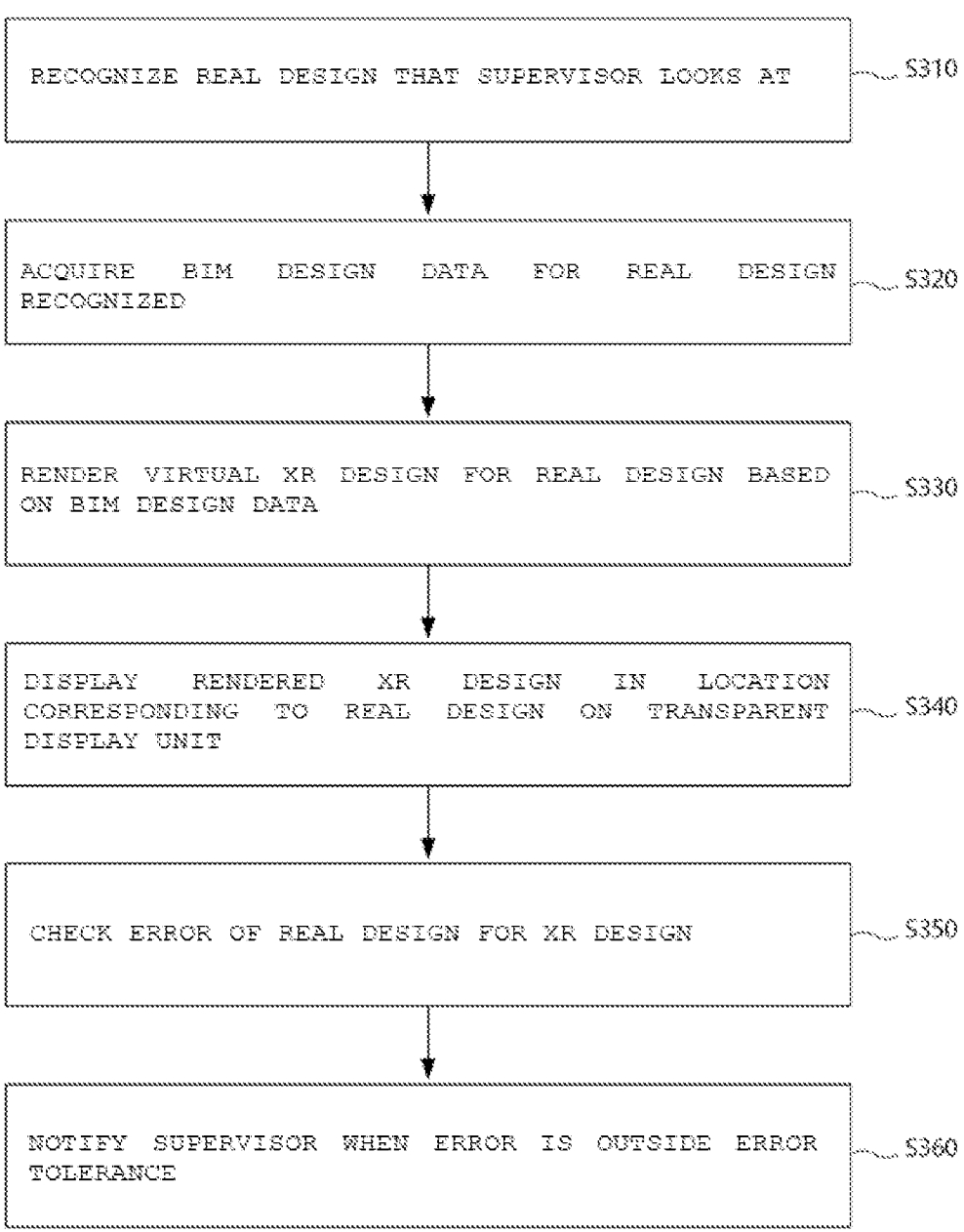

RECOGNIZE REAL DESIGN THAT SUPERVISOR LOOKS AT ⟶ S310

ACQUIRE BIM DESIGN DATA FOR REAL DESIGN RECOGNIZED ⟶ S320

RENDER VIRTUAL XR DESIGN FOR REAL DESIGN BASED ON BIM DESIGN DATA ⟶ S330

DISPLAY RENDERED XR DESIGN IN LOCATION CORRESPONDING TO REAL DESIGN ON TRANSPARENT DISPLAY UNIT ⟶ S340

CHECK ERROR OF REAL DESIGN FOR XR DESIGN ⟶ S350

NOTIFY SUPERVISOR WHEN ERROR IS OUTSIDE ERROR TOLERANCE ⟶ S360

RECEIVE BIM DESIGN DATA REQUEST ~ S210

OUTPUT VIRTUAL XR DESIGN FOR REAL DESIGN TO CONSTRUCTION SUPERVISION ASSISTANCE APPARATUS ~ S230

RECEIVE DATA INDICATING ERROR BETWEEN REAL DESIGN AND XR DESIGN ~ S250

CORRECT BIM DESIGN DATA SO THAT XR DESIGN MATCHES REAL DESIGN ~ S250

REAL DESIGN     VIRTUAL XR DESIGN

A

APPARATUS, METHOD AND PROGRAM FOR AUTOMATICALLY DESIGNING EQUIPMENT LINES IN BIM DESIGN DATA

CROSS-REFERENCE TO RELATED APPLICATION

A claim for priority under 35 U.S.C. § 119 is made to Korean Patent Application No. 10-2021-0080395 filed on Jun. 21, 2021 in the Korean Intellectual Property Office, the entire contents of which are hereby incorporated by reference.

BACKGROUND

1. Technical Field

The present disclosure relates to an apparatus for automatically designing an equipment line, and more particularly, to an apparatus for automatically designing an equipment line in BIM design data.

2. Description of Related Art

Recently, most construction sites use Building Information Modeling (BIM) design data based on BIM technology, and construction is performed based on BIM design data.

There are various equipment lines, such as pipelines, cable lines, and duct lines, for equipment lines to be installed in a construction site.

As a representative example, numerous pipes may be complexly configured according to their respective purposes in a construction site, and a process of designing these pipes may be overly complex and take long for a person to perform economically.

Accordingly, when data such as the characteristics of a construction site, internal structure, and necessary equipment lines are input, there is a need for technology to design an equipment line based on artificial intelligence and complete the BIM design data, but such technology is currently not disclosed.

SUMMARY

An aspect of the present disclosure is directed to providing a system for automatically designing a pipeline.

In addition, when a plurality of pieces of equipment line installation data including a start point and an end point for equipment line installation in a construction site is input, an equipment line is automatically designed in BIM design data based thereon.

In addition, the present disclosure is configured to automatically design an equipment line corresponding to each of a plurality of pieces of equipment line installation data in consideration of an avoidance condition including the internal structure data of a construction site and the equipment data to be placed on the construction site.

The aspects of the present disclosure are not limited to those mentioned above, and other aspects not mentioned herein will be clearly understood by those skilled in the art from the following description.

An apparatus for automatically designing an equipment line according to an embodiment of the present disclosure includes: a database in which 3D-based BIM design data of a construction site, internal structure data of the construction site, and equipment data to be placed on the construction site are stored; a user interface for receiving equipment line installation data for equipment line design in the BIM design data; and a processor for automatically designing an equipment line corresponding to each of a plurality of pieces of equipment line installation data in consideration of an avoidance condition including the internal structure data of the construction site and the equipment data to be placed on the construction site when the plurality of pieces of equipment line installation data including a start point and an end point for equipment line installation in the construction site are input into the user interface, wherein when at least a portion of areas of a plurality of equipment lines overlap each other in a process of designing the equipment line, the processor is configured to perform a correction in a manner of pushing the plurality of overlapping equipment lines away from one another in the equipment line design data based on a radius of each of the plurality of overlapping equipment lines and a size of the overlapping areas so that the plurality of pieces of equipment line do not overlap with one another.

The equipment line is any one of a pipeline, a cable line, and a duct line.

In addition, the processor is configured to perform a correction in the manner of pushing the plurality of overlapping equipment lines away from one another in the BIM design data, but correct the plurality of equipment lines so as not to exceed a preset allowable number of equipment line inflection points.

In addition, the processor is configured to design all equipment lines existing in the BIM design data to have a bend of 90°, but when at least one equipment line having an angle that deviates from the bend of 90° is generated after performing a correction of the plurality of equipment lines, the processor is configured to output a notification instructing a correction of the at least one equipment line.

In addition, the processor is configured to perform a correction in the manner of pushing the plurality of overlapping equipment lines away from one another in the BIM design data, and includes a material and purpose of use of each of the plurality of overlapping equipment lines as a correction condition, so that the determination of whether to correct the plurality of overlapping equipment lines and a pushing extent are determined in a way that minimizes design costs.

In addition, the processor is further configured to include, in the correction condition, an equipment line joint material cost accompanying an equipment line inflection point generated in a process of correcting the plurality of overlapping equipment lines.

In addition, based on process data of the construction site and a purpose of use of the equipment line, the processor is configured to determine a material and a radius of the equipment line.

In addition, the processor is configured to design equipment lines in the order of equipment line installation data in which a straight-line distance between a start point and an end point is close among the inputted plurality of equipment line installation data.

In addition, based on BIM design data for which a design of the equipment line is completed and internal structure data of the construction site, the processor is configured to derive at least one reference mark installation location suitable for installation of a reference mark necessary for an XR device for construction supervision in the site construction supervision process of the construction site to match actual measurement data of the construction site and design data in the BIM design data.

In addition, a method for automatically designing an equipment line according to an embodiment of the present disclosure is performed by an apparatus for automatically designing an equipment line and includes: providing a database with BIM design data of a construction site, internal structure data of the construction site, and equipment data to be placed on the construction site; receiving a plurality of pieces of equipment line installation data including a start point and an end point for equipment line installation in the BIM design data of the construction site through a user interface; and automatically designing an equipment line corresponding to each of a plurality of pieces of equipment line installation data in the BIM design data in consideration of an avoidance condition including the internal structure data of the construction site and the equipment data to be placed on the construction site, wherein when at least a portion of areas of a plurality of equipment lines overlap in a process of designing the equipment line, the apparatus for automatically designing an equipment line is configured to perform a correction in a manner of pushing the plurality of overlapping equipment lines away from one another in the BIM design data based on a radius of each of the plurality of overlapping equipment lines and a size of the overlapping areas so that the plurality of pieces of equipment line do not overlap with one another.

In addition to the above, another method for implementing the present disclosure, another system, and a computer-readable recording medium for recording a computer program for executing the method may be further provided.

According to an embodiment of the present disclosure, there may be provided with a system for automatically designing a pipeline.

In addition, according to an embodiment of the present disclosure, when plurality of pieces of equipment line installation data including a start point and an end point for equipment line installation in a construction site is input, an equipment line is automatically designed in BIM design data based thereon.

In addition, according to an embodiment of the present disclosure, the present disclosure is configured to automatically design an equipment line corresponding to each of a plurality of pieces of equipment line installation data in consideration of an avoidance condition including internal structure data of a construction site and equipment data to be placed on the construction site.

The advantages of the present disclosure are not limited to those mentioned above, and other advantages not mentioned herein will be clearly understood by those skilled in the art from the following description.

BRIEF DESCRIPTION OF THE DRAWINGS

FIG. 6 is a flowchart of an XR-based construction supervision assistance method according to an embodiment of the present disclosure.

DETAILED DESCRIPTION

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains, and the present disclosure will only be defined by the appended claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate the existence of one or more other elements other than stated elements but do not exclude presence of additional elements. Like reference denotations refer to like elements throughout the specification. As used herein, the term "and/or" includes each and all combinations of one or more of the mentioned elements. It will be understood that, although the terms "first," "second," and the like, may be used herein to describe various elements, these elements should not be limited by these terms. These terms are only used to distinguish one element from another element. Accordingly, a first element mentioned below could be termed a second element without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, the embodiments of the present disclosure will be described in detail with reference to the accompanying drawings.

Figure 1:
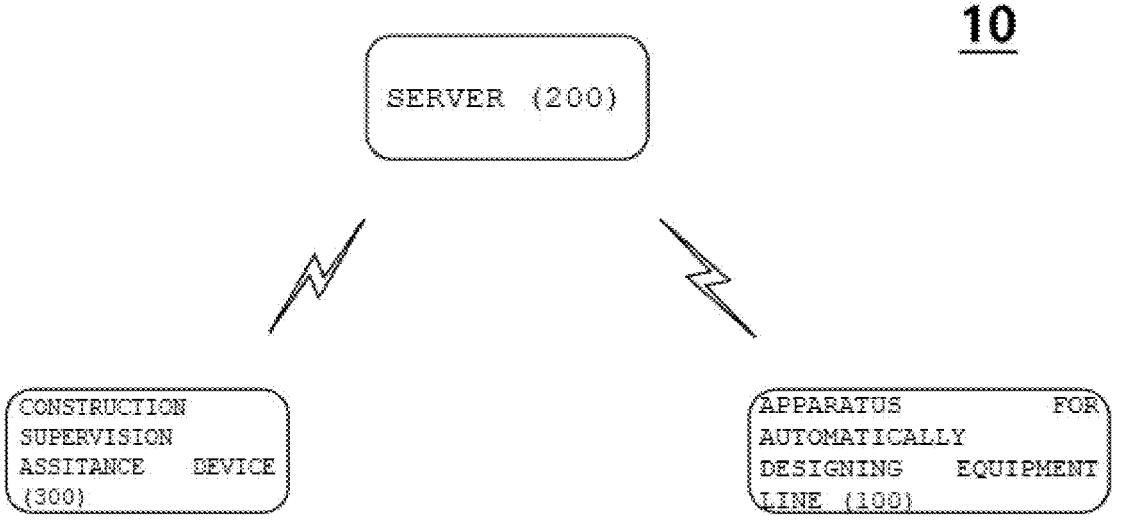
FIG. 1 is a schematic diagram of a system for automatically designing an equipment line according to an embodiment of the present disclosure.

FIG. 1 is a schematic diagram of a system 10 for automatically designing an equipment line according to an embodiment of the present disclosure.

The system 10 for automatically designing an equipment line according to an embodiment of the present disclosure includes an apparatus 100 for automatically designing an equipment line, a server 200, and a construction supervision assistance apparatus 300.

The present specification includes three embodiments of the apparatus 100 for automatically designing an equipment line, a design, construction and construction supervision service providing server 200, and an XR-based construction supervision assistance apparatus 300.

The apparatus 100 for automatically designing an equipment line completes BIM design data by automatically designing an equipment line in the 3D-based BIM design data, the server 200 transmits the BIM design data to a contractor to proceed with the construction, and a supervisor performs a construction supervision task by using the construction supervision assistance apparatus 300.

In addition, the server 200 corrects the BIM design data from various pieces of data received from the construction supervision assistance apparatus 300, and also receives and stores a design review checked by the supervisor.

A more detailed description of each embodiment will be described with reference to FIGS. 2 to 12 below.

Figure 2:
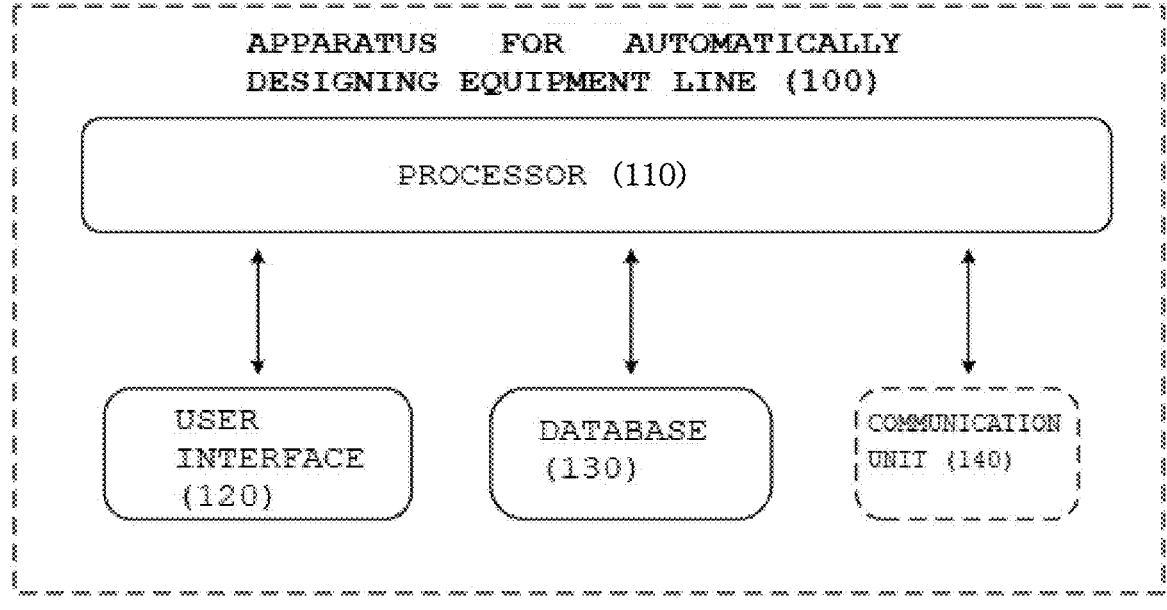
FIG. 2 is a block diagram of an apparatus for automatically designing an equipment line according to an embodiment of the present disclosure.

FIG. 2 is a block diagram of an apparatus for automatically designing an equipment line according to an embodiment of the present disclosure.

Figure 3:
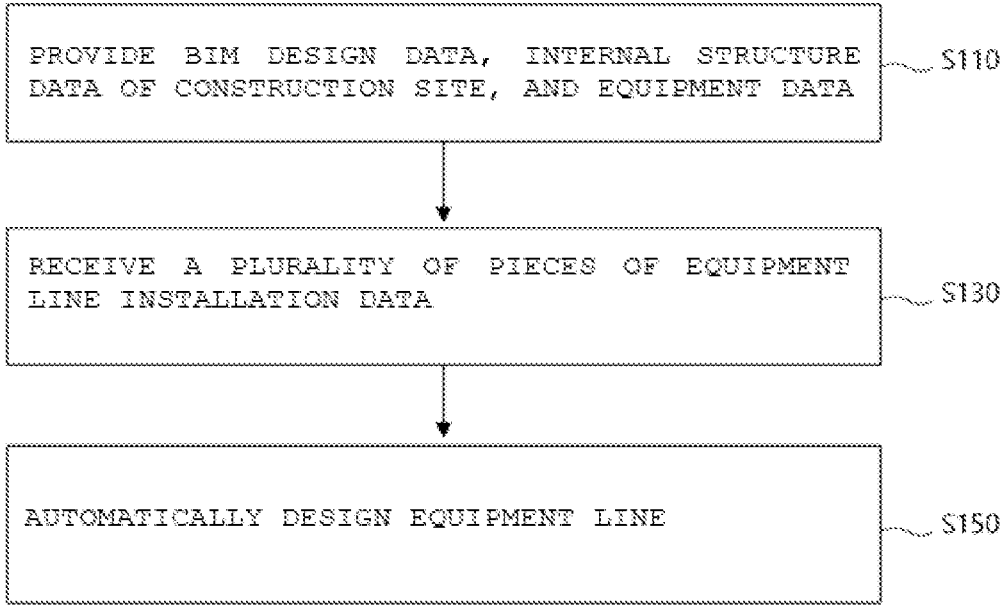
FIG. 3 is a flowchart of a method for automatically designing an equipment line according to an embodiment of the present disclosure.

FIG. 3 is a flowchart of a method for automatically designing an equipment line according to an embodiment of the present disclosure.

Referring to FIG. 2, the apparatus 100 for automatically designing an equipment line according to an embodiment of the present disclosure includes a processor 110, a user interface 120, and database 130, and may further include a communication unit 140 according to an embodiment.

The apparatus 100 for automatically designing an equipment line according to an embodiment of the present disclosure may be implemented as a computer or data processing procedure, or may be implemented in the form of a server.

Figure 7:
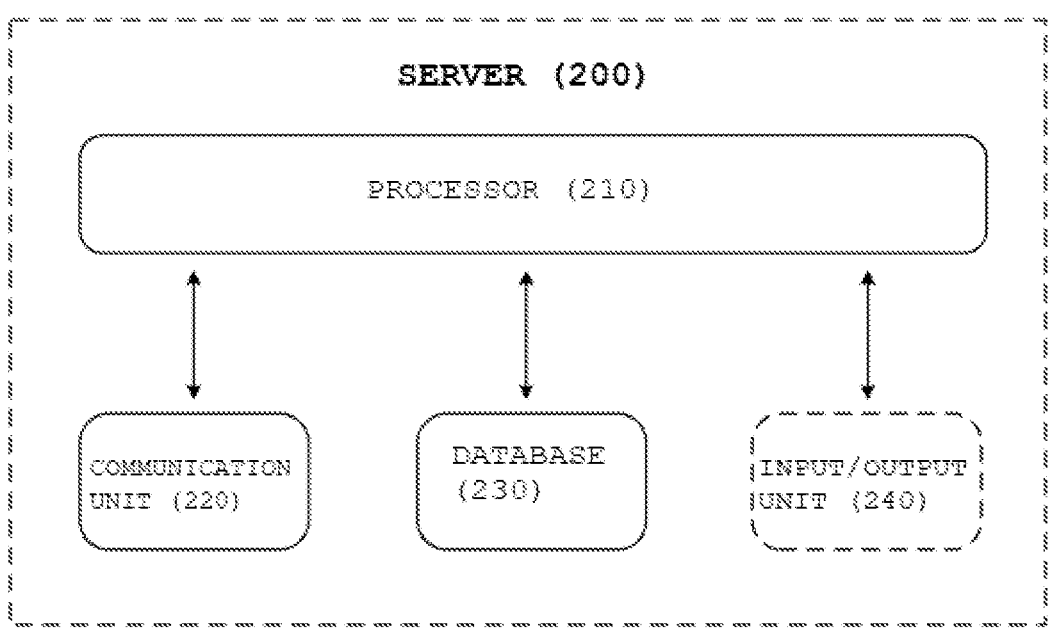
FIG. 7 is a block diagram of a design, construction and supervision service providing server according to an embodiment of the present disclosure.

The apparatus 100 for automatically designing an equipment line according to an embodiment of the present disclosure may be configured separately, but may be included as a configuration within the design, construction and supervision service providing server 200 of FIG. 7.

The database 130 stores 3D-based BIM design data of a construction site, internal structure data of the construction site, and equipment data to be placed on the construction site.

The user interface 120 receives equipment line installation data for equipment line design in 3D-based BIM design data.

As described above, when the apparatus 100 for automatically designing an equipment line is configured as a server, the communication unit 140 having a wired/wireless communication function is further provided, and the processor 110 may provide the configuration of the user interface 120 to a terminal accessed through the communication unit 140.

The processor 110 is responsible for the operation of all configurations in the apparatus 100 for automatically designing an equipment line, and executes a method for automatically designing an equipment line by executing instructions and algorithms stored in the database 130 and memory.

The internal structure data may mean 3D scanned data of the actual construction site through a 3D lidar sensor, and the 3D scan data is matched with the BIM design data and stored, so that the database 130 stores the coordinates in the BIM design data of the 3D scan data.

Accordingly, when the captured image of a camera 350 or the sensing data of a lidar 340 is received, the processors 210 and 310 match the internal structure data stored in the databases 130, 230, and 330 to load coordinate data within a construction site, or match BIM design data.

In an embodiment of the present disclosure, since the processor 110 designs the equipment lines in the 3D-based BIM design data, the equipment lines and equipment line design data designed by the processor 110 are also designed in 3D to perform XR-based construction supervision in the future.

In an embodiment of the present disclosure, various equipment lines such as a pipeline, an electric cable line, a communication cable line, and a duct line may be applied to the equipment line, and as shown in the drawing, a pipeline may be typically applied.

Hereinafter, an operation performed by the processor 110 will be described in detail with reference to FIG. 3.

The processor 110 is provided with the BIM design data of a construction site in the database 130, internal structure data of the construction site, and equipment data to be placed on the construction site (S110).

The processor 110 receives a plurality of pieces of equipment line installation data including a start point and an end point for equipment line installation in the BIM design data of a construction site through the user interface 120 (S130).

The processor 110 automatically designs an equipment line corresponding to each of a plurality of pieces of equipment line installation data in the BIM design data in consideration of an avoidance condition including internal structure data of a construction site and equipment data to be placed on the construction site (S150).

The internal structure data of a construction site may correspond to various pieces of internal structure data that may be related to designing an equipment line.

The equipment line installation data may be applied to any data related to the equipment line installation, such as the purpose of use of an equipment line, the material of the equipment line, and the diameter of the equipment line, in addition to a start point and an end point for equipment line installation.

In the process of designing an equipment line while performing S150, when at least a portion of areas of a plurality of equipment lines overlap with each other, the processor 110 is configured to correct design data in a manner of pushing the plurality of overlapping equipment lines away from one another in the equipment line design data based on a radius of each of the plurality of overlapping equipment lines and a size of the overlapping areas so that the plurality of equipment lines do not overlap with each other.

Due to this operation, the processor 110 generates equipment line design data by designing a plurality of equipment lines for the construction site, and the equipment line design data is completed by removing the overlapping areas by pushing a plurality of equipment lines having overlapping areas within the equipment line design data.

The processor 110 may generate additional equipment line design data and then add the same to BIM design data, and directly design an equipment line on the BIM design data.

In an embodiment, the processor 110 corrects a plurality of equipment lines overlapping in the BIM design data as described above, but corrects the plurality of equipment lines so as not to exceed a preset allowable number of equipment line inflection points.

For example, when the equipment line is corrected without setting these conditions in the process of correcting a plurality of overlapping equipment lines, the correction may proceed while creating a large number of inflection points.

In addition, when a large number of inflection points are generated as described above, the cost of installing an equipment line (construction costs) may increase, and the complexity of construction may increase.

However, when the apparatus 100 for automatically designing an equipment line according to an embodiment of the present disclosure sets an allowable number of inflection points, the processor 110 prevents the inflection points from exceeding the allowable number thereof and corrects a plurality of equipment lines.

In an embodiment, the processor 110 is configured to design all equipment lines existing in the BIM design data to have a bend of 90°.

When at least one equipment line having an angle that deviates from the bend of 90° is generated after performing a correction of the plurality of equipment lines, the processor 110 is configured to output a notification instructing a correction of the corresponding equipment line.

The apparatus 100 for automatically designing an equipment line according to an embodiment of the present disclosure designs and corrects an equipment line to have a bend of 90° without including an inclined angle.

However, since at least one equipment line may be designed and corrected to have an angle other than 90° by various variables such as BIM design data, internal structure data of a construction site, and the like, when such an equipment line exists, the processor 110 provides a notification to a user/administrator to correct the same, thereby correcting the occurrence of errors in automatic design that may occur.

In an embodiment, the processor 110 includes a material and purpose of use of each of the plurality of overlapping equipment lines as a correction condition, so that the determination of whether to correct the plurality of overlapping equipment lines and a pushing extent are determined in a way that minimizes design costs.

As described above, the equipment line installation data may include the purpose of use of an equipment line, the material of the equipment line, and the diameter of the equipment line, in addition to a start point and an end point for equipment line installation.

Accordingly, the equipment line to be installed in a construction site may have a different purpose of use even between the equipment lines installed nearby, and thus the material of the equipment line may be different.

In consideration of the above, the processor 110 corrects a plurality of overlapping equipment lines in a manner that pushes each thereof away from each other, but by determining whether to correct the plurality of overlapping equipment lines in a way that minimizes design costs and a pushing extent, it is possible to reduce the cost of constructing an equipment line in a construction site.

For example, when a unit price per length of A equipment line is much higher than that of B equipment line in a situation where the A equipment line and the B equipment line overlap within a certain range, the processor 110 may correct the equipment line in a direction to minimize the correction of the A equipment line and correct the location and the path of the B equipment line.

In an embodiment, the processor 110 is further configured to include, in the correction condition, an equipment line joint material cost accompanying an equipment line inflection point generated in a process of correcting the plurality of overlapping equipment lines.

For example, when the number of inflection points of the equipment line increases, the cost of the equipment line joint material is added, and this cost may be additionally fluctuated depending on conditions such as the type of equipment line, purpose of use, material, and the like.

Accordingly, the processor 110 may further include these points as a correction condition to perform correction on the overlapping equipment line, thereby reducing the equipment line construction cost.

In an embodiment, the processor 110 may determine a material and radius of each equipment line based on process data of a construction site and a use purpose (purpose) of the equipment line.

For this operation, the database 130 stores an algorithm that may determine a material and radius of the equipment line according to the purpose of use of the equipment line, the process data of a construction site where the equipment line is to be installed, and the processor 110 may be operated based on the algorithm.

Accordingly, even when the user does not directly set the material and radius of each equipment line designed by a user, the equipment line as well as a material and radius may be automatically designed.

In addition, the processor 110 is configured to design equipment lines in the order of equipment line installation data in which a straight-line distance between a start point and an end point is close among the inputted plurality of equipment line installation data.

In an embodiment, based on BIM design data for which a design of the equipment line is completed and internal structure data of the construction site, the processor 110 is configured to derive at least one reference mark installation location suitable for installation of a reference mark necessary for an XR device for construction supervision in the site construction supervision process of the construction site to match actual measurement data of the construction site and design data in the BIM design data.

According to an embodiment of the present disclosure, when the design of an equipment line is completed and BIM design data is completed, the server 200 provides the BIM design data to a contractor, and the contractor proceeds with construction based on the BIM design data.

In addition, the supervisor (user) who supervises a construction site wears an XR-based construction supervision assistance apparatus to capture and supervise the construction site, and the server 200 checks errors by matching the actual measurement data of the site with the BIM design data based on the image captured from the construction supervision assistance apparatus.

The reference mark is used to accurately match the actual measurement data of a site and the BIM design data, and the apparatus 100 for automatically designing an equipment line may derive and provide an installation location suitable for installation of the reference mark based on the BIM design data and the internal structure data of the construction site.

In an embodiment, the apparatus 100 for automatically designing an equipment line may derive a plural/multiple reference mark installation locations and generate an image or code for each reference mark.

Such an image or code becomes a way for identifying each reference mark, and the database 230 of the server 200 stores the image or code of each reference mark together with the location data of the reference mark.

The apparatus 100 for automatically designing an equipment line according to an embodiment of the present disclosure may improve a design process in a site-oriented manner by introducing AI technology in the BIM technology-based MEP design process.

In addition, the processor 110 may implement the present disclosure by adopting a suitable authoring tool from among Rhino 3D Grasshopper or dynamo scripting, Unreal Engine Blueprint for connecting equipment lines between equipment and equipment.

Figure 4:
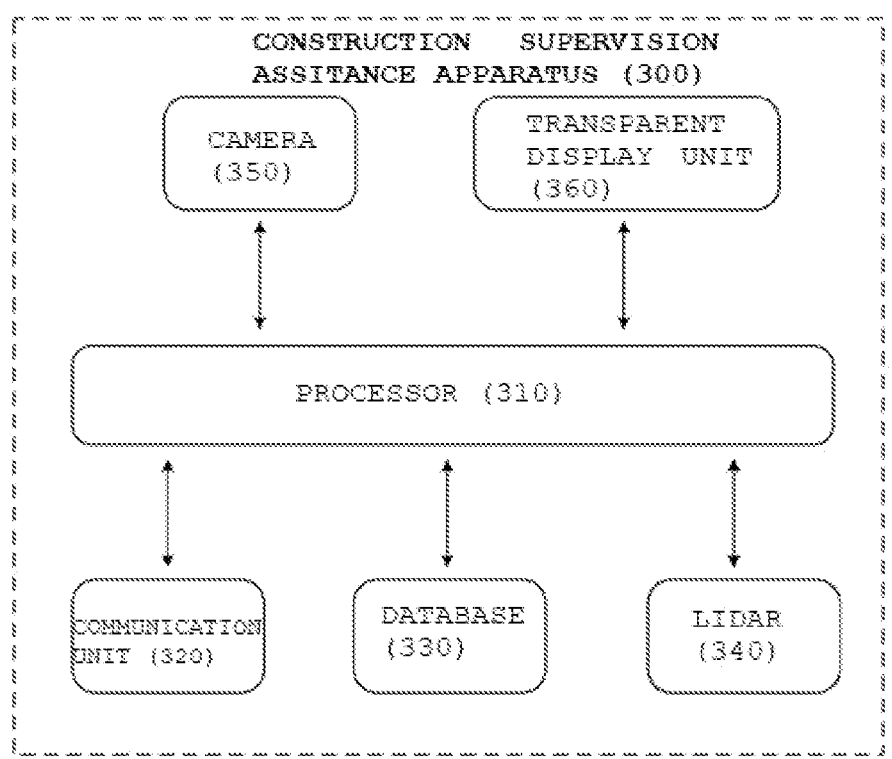
FIGS. 4 and 5 are block diagrams of an XR-based construction supervision assistance apparatus according to an embodiment of the present disclosure.
Figure 5:
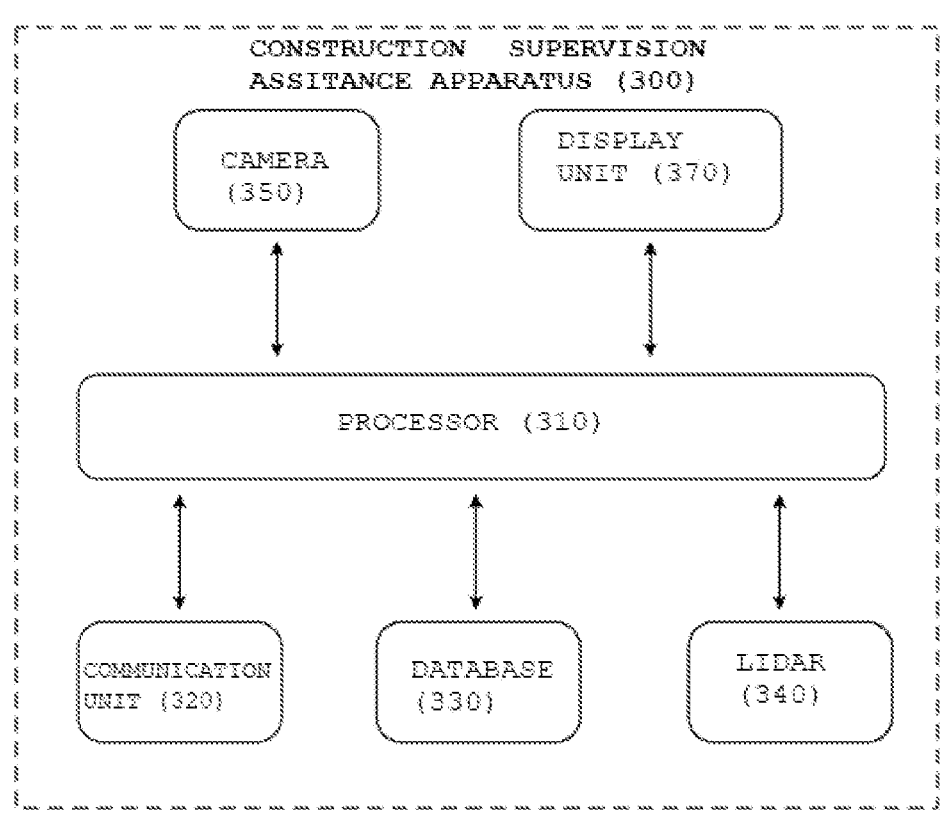

FIGS. 4 and 5 are block diagrams of an XR-based construction supervision assistance apparatus 300 according to an embodiment of the present disclosure.

FIG. 6 is a flowchart of an XR-based construction supervision assistance method according to an embodiment of the present disclosure.

FIG. 4 illustrates that the construction supervision assistance apparatus 300 is configured in the form of wearable glasses, and FIG. 5 illustrates that the construction supervision assistance apparatus 300 is configured in the form of a terminal or a tablet PC.

Accordingly, in the construction supervision assistance apparatus 300 as shown in FIG. 4, a supervisor (a user) wears the construction supervision assistance apparatus 300 and looks at a transparent display unit 360 to conduct supervision of a construction site. In the construction supervision assistance apparatus as shown in FIG. 5, a supervisor (a user) carries the construction supervision assistance apparatus 300 by hand and looks at a display unit 370 to conduct supervision of a construction site.

Hereinafter, the construction supervision assistance apparatus 300 according to an embodiment of the present disclosure will be mainly used by a supervisor who supervises a construction site, but is not limited thereto, so it will be described as a user.

In other words, the user referred to in the embodiment may mean a supervisor.

However, the present disclosure is not limited thereto, and the construction supervision may be carried out even while wearing the construction supervision assistance apparatus 300 as shown in FIG. 4 and carrying the construction supervision assistance apparatus 300 as shown in FIG. 5 simultaneously. In this case, the server 200 may support a dual mode.

Since the two construction supervision assistance apparatuses 300 have the same configuration and purpose of the present disclosure except for the configuration of the transparent display unit 360 and the display unit 370, an XR-based construction supervision assistance apparatus 300 according to an embodiment of the present disclosure will be described based on FIG. 4, and when there is a difference in the construction supervision assistance apparatus 300 of FIG. 5, it will be described furthermore.

Referring to FIG. 4, the XR-based construction supervision assistance apparatus 300 includes the processor 310, a communication unit 320, database 330, a lidar 340, a camera 350 and a transparent display unit 360.

The communication unit 320 acquires/receives 3D-based BIM design data for at least one real design installed in a construction site.

Specifically, the processor 310 may request BIM design data for a construction site to the server 200, and in response, the server 200 may transmit the BIM design data for the corresponding construction site to the construction supervision assistance apparatus 300.

The server 200 may transmit BIM design data for the corresponding construction site in batches at once, and transmit the corresponding BIM design data based on the captured image received from the construction supervision assistance apparatus 300.

The database 330 may store various commands, algorithms for operating the construction supervision assistance apparatus 300, and 3D-based BIM design data received from the server 200 may be stored.

The lidar 340 may be configured as a general lidar, and when a user (a supervisor) wears the construction supervision assistance apparatus 300, based on the sensing data that emits a laser pulse and is reflected back from the target, it is possible to sense the construction site in front of the user and measure the distance from the user of various structures (for example, equipment, equipment lines, pipelines, and the like).

By capturing the front of a user, and in detail, by capturing the direction at which the user is looking, and generating a photographed image, the camera 350 allows the server 200 to analyze the captured image, generate an XR design, and display the same on the transparent display unit 360.

The transparent display unit 360 is transparent and is a way for displaying XR content in the form of an HMD. A user looks forward through the transparent display unit 360, and the user may visually identify the XR design and XR content received from the server 200 by being displayed on the transparent display unit 360.

The processor 110 is responsible for controlling all configurations in the construction supervision assistance apparatus 300, and executes an XR-based construction supervision assistance method by executing instructions and algorithms stored in the database 330.

Hereinafter, with reference to FIG. 6, the operation of the processor 310 will be described in detail.

The processor 310 recognizes the real design that a user looks at through the transparent display unit 360, based on the image captured by the camera 350 (S310).

The processor 310 may more accurately recognize the real design by utilizing the sensing data of the lidar (340).

In detail, the processor 310 may recognize the real design that a user looks at through the transparent display unit 360 based on the image captured by the camera 350, and calculate the distance between each recognized real design and the user based on the sensing data of the lidar 340.

When the user's preset motion gesture for the real design in the captured image received from the camera 350 is sensed to be included, the processor 310 may determine the real design related to the sensed motion gesture as a recognition target.

The preset motion gesture may correspond to an act of pointing to a real design with a hand, an act of touching a real design with a hand, an act of designating a range of a specific real design with a hand, and the like.

In addition, the camera 350 may further include a camera (not shown) for tracking user gaze through gaze tracking based on the eye movement of a user separately, in addition to a front capturing camera 350 described above.

The processor 310 may accurately grasp user gaze through a camera for gaze tracking (not shown), and may determine a real design that a user looks at for a preset time or longer as a recognition target.

The processor 310 acquires BIM design data for a real design recognized in S310 (S320).

As described above, the server 200 may transmit BIM design data for the corresponding construction site in batches at once, and may provide the BIM design data according to the user's current location.

For example, the processor 310 may transmit data about the real design recognized in S310 to the server 200, and may request BIM design data for the corresponding construction site.

In an embodiment, the processor 310 may transmit data about the real design recognized in S310 to the server 200, and may request BIM design data required at the user's current location.

In an embodiment, when an image or code of at least one reference mark is recognized in the captured image, the processor 310 may load the location data of the corresponding reference mark, and request BIM design within a preset range from the corresponding reference mark to the server 200.

In an embodiment, when the image of the reference mark captured through the camera 350 is received from the construction supervision assistance apparatus 300, the server 200 may load the location data of the corresponding reference mark and transmit BIM design data within a preset range from the corresponding reference mark to the construction supervision assistance apparatus 300.

The processor 310 renders a virtual XR design for a real design based on the BIM design data obtained in S320 (S330).

The processor 310 displays the rendered XR design in S330 in a location corresponding to the real design on the transparent display unit (S340).

When the BIM design data is received from the server 200, the processor 310 renders a virtual XR design for the real design that a user is currently looking at through the transparent display unit 360.

The virtual XR design for the real design is rendered based on the BIM design data, meaning that the design that should have been constructed as originally designed is displayed.

However, due to the nature of construction, errors may occur with the BIM design data due to various causes, and the XR-based construction supervision assistance apparatus 300 according to an embodiment of the present disclosure renders and displays a virtual XR design so that a user may identify the errors through the transparent display unit 360.

The processors 310 and 210 compare the BIM design data of the captured image and the XR design, and check the error of the real design for the XR design (S350).

When the error checked in S350 is outside a preset error tolerance, the processors 310 and 210 perform an operation to notify a supervisor (S360).

The processors 310 and 210 may recognize at least one reference mark in the captured image, and check errors by matching the BIM design data of the real design and the XR design in the captured image based on the recognized reference mark.

In an embodiment of the present disclosure, checking errors by matching the BIM design data of the real design and the XR design means checking errors that occurred during a construction process due to various causes, although a construction should have been constructed according to the BIM design data and the real design should be matched with the BIM design data.

In addition, the processors 310 and 210 may specify the location of the checked error based on the current location data of the construction supervision assistance apparatus 300 and the location of the recognized reference mark.

When it is determined that an error greater than or equal to a reference has occurred, the processors 310 and 210 perform an operation to notify a supervisor, notify that the error has occurred and request the supervisor to take action thereon.

For example, when the error tolerance is set to 98% of the coincidence rate, when an error of 97% occurs, the processors 210 and 310 provide an error occurrence notification to a supervisor through the construction supervision assistance apparatus 300.

The processors 210 and 310 may display the same XR design part as a part of the real design that is outside of the error tolerance through a visual effect.

For example, the processors 210 and 310 may display the same XR design part as a part of the real design that is outside of the error tolerance in a different color, display larger, provide a sparkling effect, or provide a blinking effect.

The supervisor inputs an error correction signal through the construction supervision assistance apparatus 300, and the processors 310 and 210 perform the following process to correct the error.

The error correction signal may be directly inputted through the construction supervision assistance apparatus 300. When a supervisor takes a specific gesture, the processors 310 and 210 may recognize the supervisor's gesture in the captured image, and determine that it is an error correction signal to perform error correction.

When an error correction signal is input, the processors 310 and 210 request correction of the BIM design data corresponding to the checked error to the server 200. When the error-corrected BIM design data received from the server 200 is received, the virtual XR design for the real design is re-rendered based on the corrected BIM design data and displayed on the transparent display unit 360.

The correction of the checked error does not necessarily have to be performed in the server 200, and the processor 310 of the construction supervision assistance apparatus 300 may directly perform the correction.

In an embodiment, the processors 310 and 210 may correct the BIM design data so that the XR design matches the real design when the error correction signal is input, and based on the corrected BIM design data, the virtual XR design for the real design may be re-rendered and displayed on the transparent display unit 360.

In conclusion, an error is corrected so that the BIM design data with errors matches the constructed real design because construction fails according to the BIM design data, resulting in an error between the real design and the BIM design data.

Figure 9:
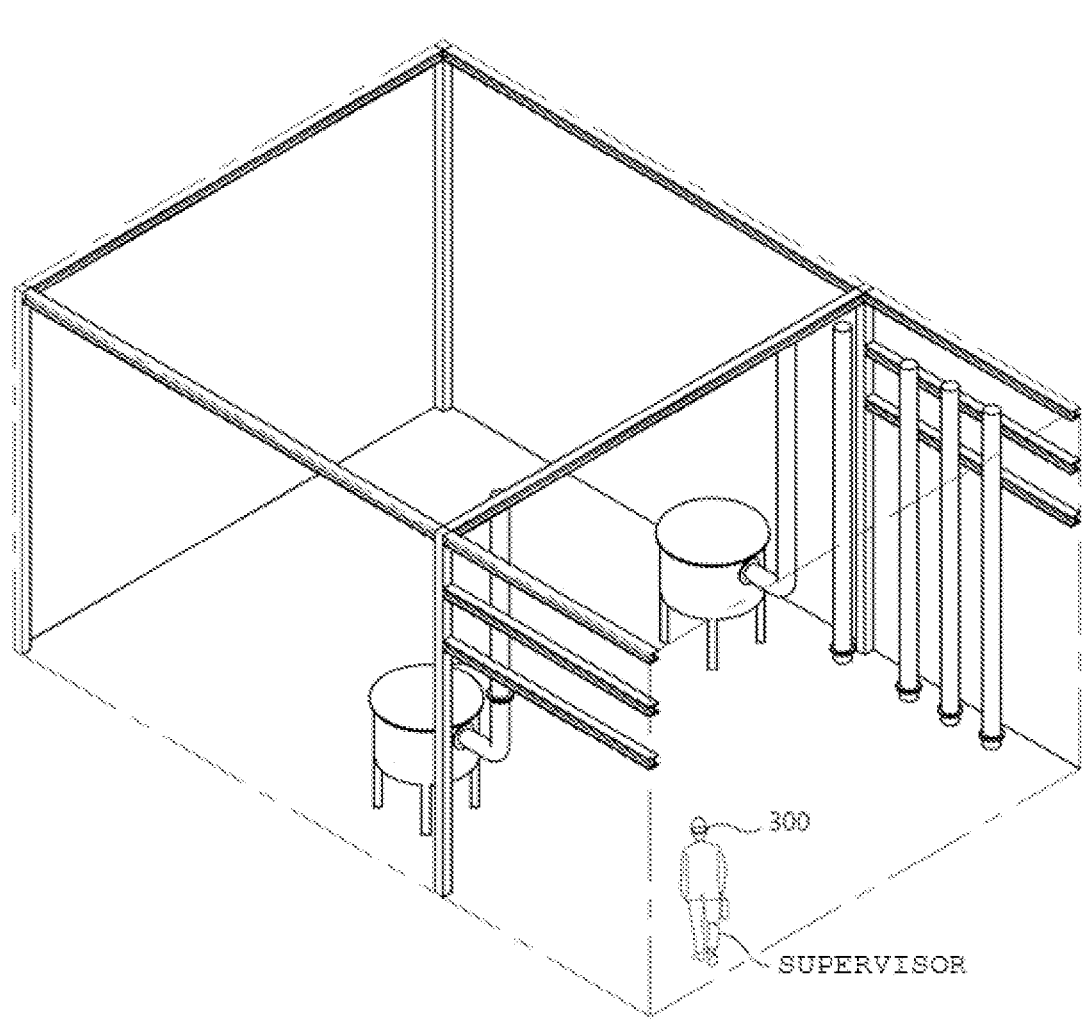
FIG. 9 is a diagram illustrating that a supervisor wears a construction supervision assistance apparatus and supervises a construction site.

FIG. 9 is a diagram illustrating that a supervisor wears the construction supervision assistance apparatus 300 and supervises a construction site.

Figure 10:
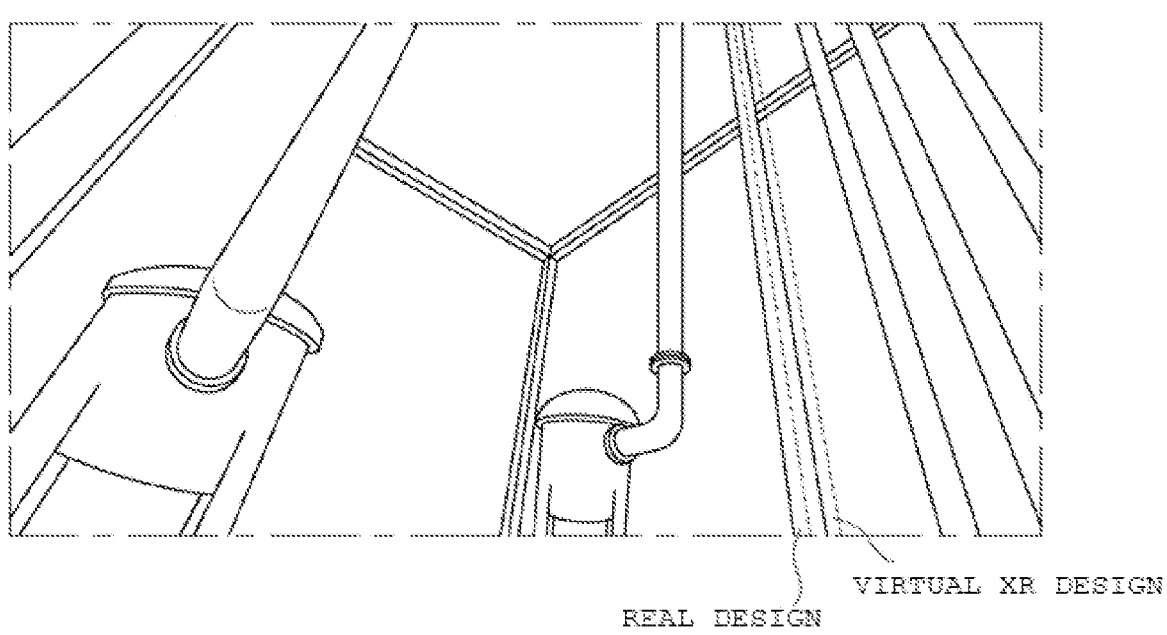
FIG. 10 is a diagram illustrating an error of a virtual design of a real design and BIM design data photographed through a construction supervision assistance apparatus.

FIG. 10 is a diagram illustrating an error of a virtual design of a real design and BIM design data captured through the construction supervision assistance apparatus 300.

Figure 11:
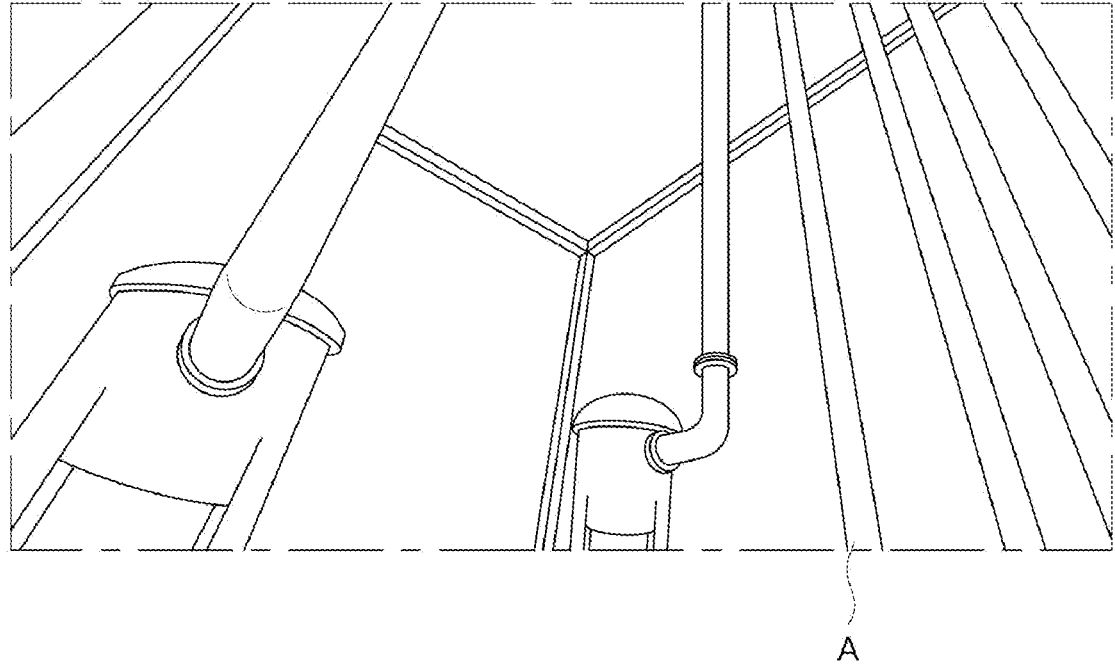
FIG. 11 is a diagram illustrating correction of errors in BIM design data.

FIG. 11 is a diagram illustrating correction of errors in BIM design data.

FIG. 9 exemplifies that a supervisor is wearing the construction supervision assistance apparatus 300 and is looking at a real design of a construction site, and FIG. 10 exemplifies a situation on the transparent display unit 360 of the construction supervision assistance apparatus 300.

In addition, FIG. 10 exemplifies that the construction error occurs and the error occurs between the real design and the virtual XR design, and the virtual XR design is indicated by dotted lines. The corresponding part is indicated beyond an error tolerance.

It is assumed that the remaining real design has no error or falls within a preset error tolerance, and thus is not separately indicated.

Alternatively, it is assumed that a virtual XR design for a real design is rendered based on the BIM design data, but the shape of the real design and the XR design coincide and are not separately indicated on the drawing.

A supervisor will check this situation through the transparent display unit 360, and input an error correction signal. The processors 310 and 210 correct the BIM design data in which an error has occurred according to the error correction signal to match the real design. When the correction is completed, it is displayed on the transparent display unit 360 as shown in FIG. 11A, so that it can be seen that there is no error in the captured image.

Figure 12:
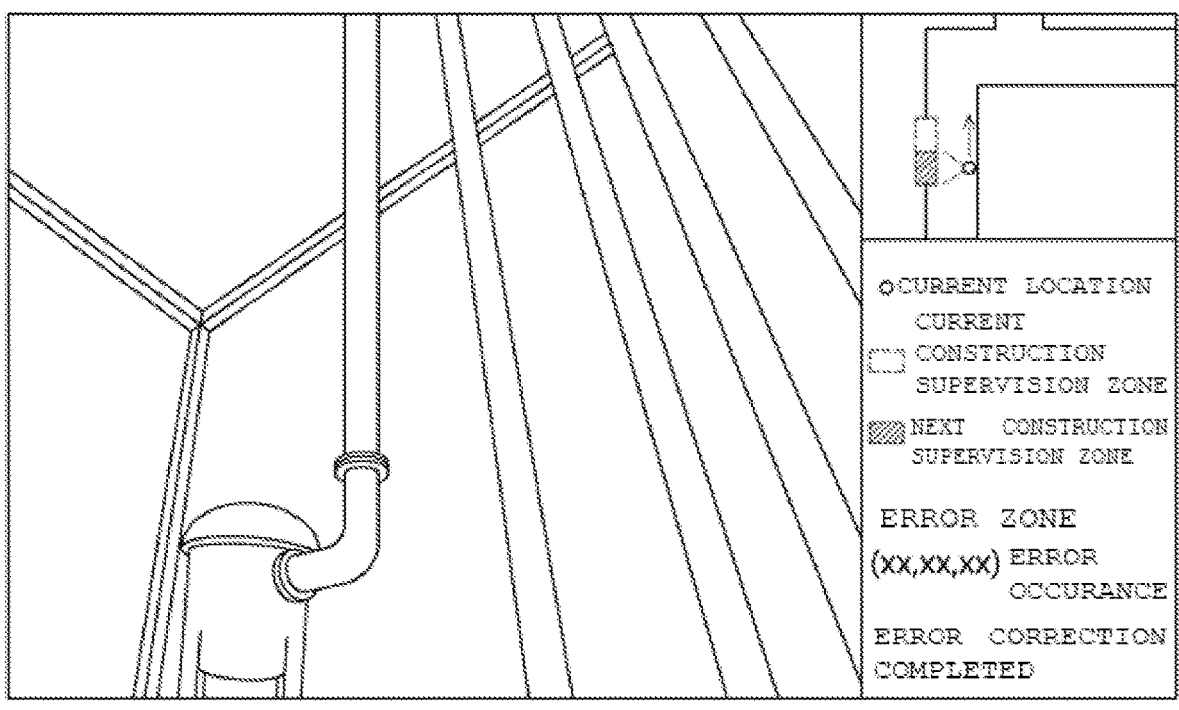
FIG. 12 is a diagram illustrating an example of guiding error correction details and a construction supervision path to a construction supervision assistance apparatus.

FIG. 12 is a diagram illustrating an example of guiding error correction details and a construction supervision path to the construction supervision assistance apparatus 300.

In an embodiment, the processors 310 and 210 may derive a construction supervision progress direction from a starting location of construction supervision by analyzing the BIM design data.

When the correction for the error in the captured image is completed, based on the construction supervision progress direction and the current location of the construction supervision assistance apparatus 300, the processors 310 and 320 may render XR content for guiding the next construction supervision location and display the same on the transparent display unit 360 or the display unit 370.

The completion of the correction for the error in the captured image means that the error correction for the real design viewed by a supervisor through the transparent display unit 360 has been completed.

Through this configuration, it is possible to guide a supervisor in a construction supervision progress direction of a construction site so that the area where construction supervision is excluded does not occur.

In an embodiment, the processors 310 and 210 generate learning data based on BIM design data within a certain range from the checked error occurrence location, and input the same in an error prediction model for deep learning.

In addition, when the BIM design data of a new construction supervision target is input, the processors 310 and 210 may analyze the BIM design data of the new construction supervision target based on an error prediction model to predict an error occurrence location within the new supervision target, and the predicted location may be provided as the construction supervision assistance apparatus 300.

Through this configuration, a supervisor may proceed with the construction supervision in more detail about the area where the error is expected to occur.

When the construction supervision assistance apparatus 300 of FIG. 5 is applied, there are differences as follows.

In the case of the construction supervision assistance apparatus 300 of FIG. 4, a user wears the construction supervision assistance apparatus 300 on the face and looks at the real design through the transparent display unit 360. However, in the case of the construction supervision assistance apparatus 300 of FIG. 5, a user uses the construction supervision assistance apparatus 300 while carrying the same, there is a difference as follows.

The supervisor uses a camera of the construction supervision assistance apparatus 300 to capture the front, and the processors 310 and 210 display the captured image including the real design captured through the camera 350 on the display unit 370, obtains BIM design data for the real design recognized in the captured image, renders a virtual XR design for the real design based on the obtained BIM design data, and displays the rendered XR design on the display unit 370 in a location corresponding to the real design.

Since the construction supervision assistance apparatus 300 may be applied to a terminal such as a smartphone or a tablet PC or a computer, the display unit 370 may be operated as an input unit as well as an output unit, and a supervisor may input various control signals to the display unit 370.

When it is determined that an error greater than or equal to a reference has occurred, the processors 310 and 210 provide a notification that an error greater than or equal to a reference has occurred through the display unit 370 and request the supervisor to take action thereon.

The supervisor inputs an error correction signal in the display unit 370, and the processors 310 and 210 perform the following process to correct the error.

As described above, after the description of the construction supervision assistance apparatus 300 according to an embodiment of the present disclosure is finished, the design, construction and supervision service providing server 200 of a construction site will be described with reference to FIGS. 7 and 8.

The server 200 is identical in most operations of the server 200 mentioned when describing the construction supervision assistance apparatus 300, the redundant description will be omitted.

FIG. 7 is a block diagram of a design, construction and supervision service providing server according to an embodiment of the present disclosure.

Figure 8:
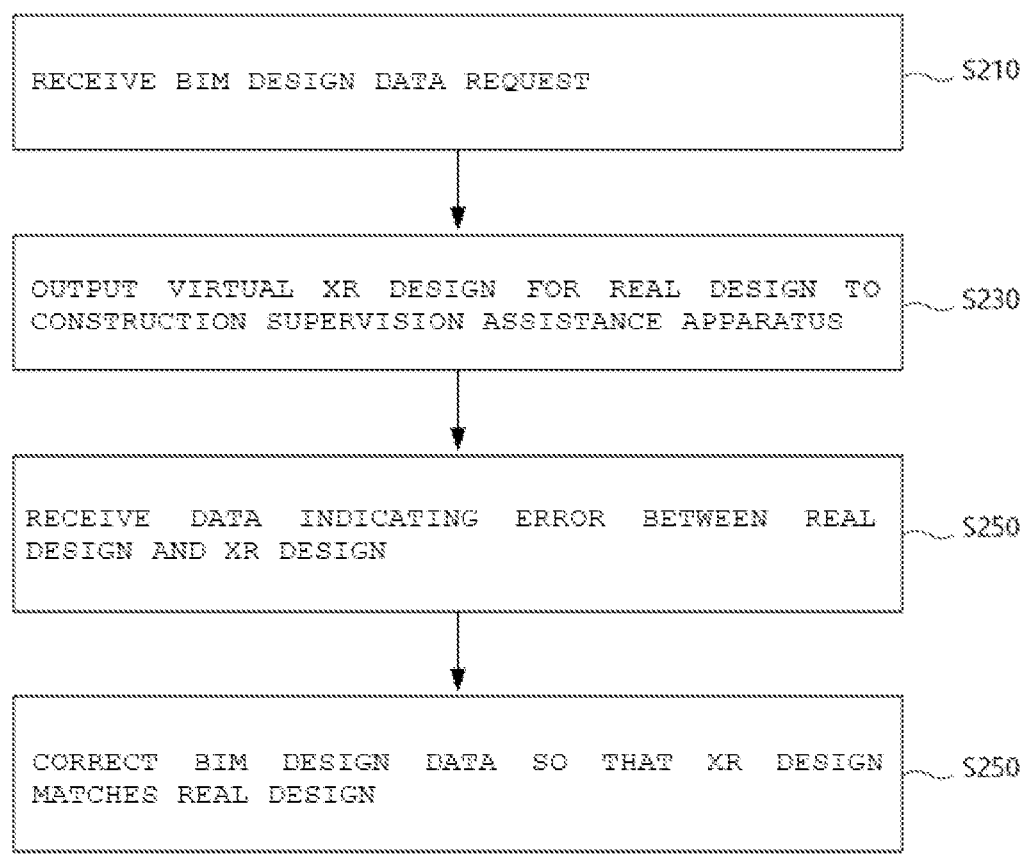
FIG. 8 is a flowchart of a design, construction and supervision service providing method according to an embodiment of the present disclosure.

FIG. 8 is a flowchart of a design, construction and supervision service providing method according to an embodiment of the present disclosure.

FIG. 9 is a diagram illustrating that a supervisor wears a construction supervision assistance apparatus and supervises a construction site.

As described above, the design, construction and supervision service providing server 200 according to an embodiment of the present disclosure may include an apparatus for automatically designing an equipment line.

Referring to FIG. 4, the design, construction and supervision service providing server 200 according to an embodiment of the present disclosure includes the processor 210, the communication unit 220, and the database 230. In certain embodiments, it may further include an input/output unit 240 for receiving various control signals and outputting results.

The communication unit 220 communicates with the XR-based construction supervision assistance apparatus that a supervisor wears or possesses.

In addition, the communication unit 220 may receive the BIM design data from an apparatus for automatically designing an equipment line, and transmit the BIM design data to a constructor server 200 and a constructor terminal.

The database 130 stores 3D-based BIM design data of a construction site, internal structure data of the construction site, and various equipment data to be placed on the construction site.

The processor 210 is responsible for the operation of all configurations in the server 200, and may provide design, construction and supervision services of a construction site by executing instructions and algorithms stored in a memory and the database 230.

Hereinafter, with reference to FIG. 5, a design, construction and supervision service providing method by the processor 210 will be described in detail.

The processor 210 receives a BIM design data request for a real design of a specific construction site from the construction supervision assistance apparatus 300 (S210).

The processor 210 provides BIM design data to the construction supervision assistance apparatus 300, and outputs a virtual XR design for the real design to the construction supervision assistance apparatus 300 (S230).

The processor 210 receives data indicating an error between the real design and the XR design from the construction supervision assistance apparatus 300 (S250).

The processor 210 corrects the BIM design data so that the XR design matches the real design based on the received error data (S270).

The error data is received when the error between the real design and the XR design is outside of a preset error tolerance as a result of the measurement of the construction supervision assistance apparatus 300, and may be received when the correction request signal of a supervisor is input.

The processor 210 may provide BIM design data for a construction site to a constructor, and in detail, the processor 210 may provide BIM design data to a constructor terminal or the server 200 through the communication unit 220.

The processor 210 may generate a design review and provide the same as the construction supervision assistance apparatus, so that a supervisor conducts a construction supervision and review for a construction site.

The processor 210 stores the check-completed design review in the database 230 when a design review in which a plurality of review items in the design review are checked is received from the construction supervision assistance apparatus 300.

In an embodiment, the database 230 stores a plurality of review items for generating a design review.

In an embodiment, the processor 210 may derive at least one review item based on the BIM design data for a construction site, the internal structure data of the construction site, and the error data received from the construction supervision assistance apparatus 300, and generate a design review based on the derived review items.

The processor 210 may analyze BIM design data to derive a construction supervision progress direction from a starting location of construction supervision. When the correction for a specific error is completed, the processor 210 provides the construction supervision assistance apparatus with an XR content for guiding the next construction supervision location based on the construction supervision progress direction and the current location of the construction supervision assistance apparatus to be rendered on the transparent display unit 360 of the construction supervision assistant apparatus 300.

The database 230 stores location data and BIM design data for at least one reference mark installed in a construction site.

In an embodiment, when a code and an image of a reference mark captured through the construction supervision assistance apparatus 300 are received, the processor 210 may load the location data of the corresponding reference mark, and transmit BIM design data within a preset range from the corresponding reference mark to the construction supervision assistance apparatus 300.

In an embodiment, the reference mark may be applied to a specific image, barcode, QR code, and the like including a code value, and the code value included in the reference mark is matched with location data in a construction site or BIM design data.

The processor 210 may recognize the code value corresponding to the reference mark in the captured image and transmit the same to the server 200, and the server 200 may load BIM design data matching the received code value from among a plurality of BIM design data stored in the database and transmit the same to the construction supervision assistance apparatus 300.

As described above, the reference mark mentioned in an embodiment of the present disclosure may be installed at a reference mark installation location derived from the apparatus 100 for automatically designing an equipment line for construction supervision service.

In an embodiment, when an error is greater than or equal to an allowable error, the processor 210 may correct BIM design data so that the part corresponding to the error within the BIM design data matches a real design, and provide the construction supervision assistance apparatus with the corrected BIM design data.

In an embodiment, the processor 210 generates learning data based on BIM design data within a certain range from an error occurrence location, and input the generated learning data in an error prediction model for deep learning.

When the BIM design data of a new construction supervision target is input, the processor 210 analyzes the BIM design data of the new construction supervision target based on an error prediction model to predict an error occurrence location within the new supervision target.

The processor 210 may provide the predicted location to the construction supervision assistance apparatus 300.

In an embodiment, the processor 210 may analyze BIM design data around the error received from the construction supervision assistance apparatus 300 within the BIM design data using an error prediction model, predict the location of another error that may occur due to the error, and provide the predicted location of another error to the construction supervision assistance apparatus 300.

For example, when a construction error occurs in a specific real design, because the error may cause a construction error in other real designs that are located near or related to the real design, it means analysis and notification at an early stage.

The method according to an embodiment of the present disclosure described above may be implemented as a program (or an application) to be executed in combination with a server, which is hardware, and stored in a medium.

The above-described program may include a code encoded by a computer language such as C, C++, JAVA, or a machine language, which a processor (CPU) of the computer can read through a device interface of the computer, such that the computer reads the program and performs the methods implemented with the program. The code may include functional codes associated with the function that defines functions necessary to perform the methods, and may include a control code associated with an execution procedure necessary for the processor of the computer to perform the functions in a predetermined procedure. Furthermore, the code may further include additional data necessary for the processor of the computer to perform the functions or a memory reference-related code associated with the location (address) of the internal or external memory of the computer, at which the media needs to be referred. In addition, when the processor of the computer needs to communicate with any other remote computer or any other remote server to perform the functions, the code may further include a communication-related code associated with how to communicate with any other remote computer or server using the communication module of the computer, and what data or media should be transmitted or received during communication.

The storing media may mean the media that does not store data for a short period of time such as a register, a cache, a memory, or the like but semi-permanently stores to be read by the device. Specifically, for example, the storing media include, but are not limited to, ROM, RAM, CD-ROM, magnetic tape, floppy disk, optical data storage device, and the like. That is, the program may be stored in various recording media on various servers that the computer can access, or various recording media on the computer of the user. In addition, the media may be distributed to a computer system connected to a network, and a computer-readable code may be stored in a distribution manner.

The steps of a method or algorithm described in connection with the embodiments of the present disclosure may be embodied directly in hardware, in a software module executed by hardware, or in a combination thereof. The software module may reside on a Random Access Memory (RAM), a Read Only Memory (ROM), an Erasable Programmable ROM (EPROM), an Electrically Erasable Programmable ROM (EEPROM), a Flash memory, a hard disk, a removable disk, a CD-ROM, or a computer readable recording medium in any form well known in the technical field to which the present disclosure pertains.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

DESCRIPTION OF REFERENCE NUMERALS

10: SYSTEM FOR AUTOMATICALLY DESIGNING AN EQUIPMENT LINE
100: APPARATUS FOR AUTOMATICALLY DESIGNING AN EQUIPMENT LINE
110: PROCESSOR
120: USER INTERFACE
130: DATABASE
140: COMMUNICATION UNIT
200: SERVER
210: PROCESSOR
220: COMMUNICATION UNIT
230: DATABASE
240: INPUT/OUTPUT UNIT
300: CONSTRUCTION SUPERVISION ASSISTANCE APPARATUS
310: PROCESSOR
320: COMMUNICATION UNIT
330: DATABASE
340: LIDAR
350: CAMERA
360: TRANSPARENT DISPLAY UNIT
370: DISPLAY UNIT

The invention claimed is:

1. A system for automatically designing an equipment line, the system comprising:
a designing apparatus configured to automatically design an equipment line;
a server; and
a construction supervision assistance apparatus, which is a Head-mounted display (HMD) device,
wherein the designing apparatus comprises:

a database in which 3D-based Building Information Model (BIM) design data of a construction site, internal structure data of the construction site, and equipment data to be placed on the construction site are stored;
a user interface for receiving equipment line installation data for equipment line design in the BIM design data; and
a processor for automatically designing an equipment line corresponding to each of a plurality of pieces of equipment line installation data in consideration of an avoidance condition including the internal structure data of the construction site and the equipment data to be placed on the construction site when the plurality of pieces of equipment line installation data including a start point and an end point for equipment line installation in the construction site are input into the user interface,
wherein when at least a portion of areas of a plurality of equipment lines overlap each other in a process of designing the equipment line, the processor is configured to perform a correction in a manner of pushing the plurality of overlapping equipment lines away from one another in the equipment line design data based on a radius of each of the plurality of overlapping equipment lines and a size of the overlapping areas so that the plurality of pieces of equipment line do not overlap with one another,
wherein based on the BIM design data of which a design of the equipment line is completed and internal structure data of the construction site, the processor of the designing apparatus is configured to, based on the BIM design data and the internal structure data of the construction site, derive at least one reference mark installation location suitable for installation of a reference mark, which is used to accurately match actual measurement data of the construction site and the BIM design data, wherein the designing apparatus is configured to derive a plurality of reference mark installation locations, and generate an image or code for each reference mark of the plurality of reference mark installation locations, wherein the image or the code for each reference mark identifies each reference mark, and the server stores the image or the code for each reference mark together with location data of each reference mark,
wherein the construction supervision assistance apparatus comprises:
a processor configured to control all configurations in the construction supervision assistance apparatus;
a lidar configured to, when a supervisor wears the construction supervision assistance apparatus, based on sensing data that emits a laser pulse and is reflected back from a target, sense the construction site in front of the supervisor and measures a distance from the supervisor of various structures;
a camera configured to capture images; and
a transparent display that is transparent and is configured to display an eXtended reality (XR) design content,
wherein the processor of the construction supervision assistance apparatus is configured to request the BIM design data of a construction site to the server, and in response, the server transmits the BIM design data of the corresponding construction site to the construction supervision assistance apparatus, wherein the server transmits the BIM design data of the corresponding construction site, based on the captured image received from the construction supervision assistance apparatus, wherein the construction supervision assistance apparatus, by capturing, by the camera, a direction at which the supervisor is looking, and generating a photographed image, requests the server to analyze the captured image, generate the XR design content, and display the XR design content on the transparent display, wherein the server and the construction supervision assistance apparatus compare the BIM design data of the captured image and the XR design, and check an error of a real design of the construction site for the XR design, wherein, when the error checked is outside a preset error tolerance, the server and the construction supervision assistance apparatus perform an operation to notify the supervisor, wherein the server and the construction supervision assistance apparatus recognize at least one reference mark in the captured image, and check errors by matching the BIM design data of the real design and the XR design in the captured image based on the recognized reference mark, wherein the server and the construction supervision assistance apparatus specify the location of the checked error based on current location data of the construction supervision assistance apparatus and the location of the recognized reference mark, wherein, when it is determined that an error greater than or equal to a predetermined reference value has occurred, the server and the construction supervision assistance apparatus perform an operation to notify a supervisor, notify that the error has occurred and request the supervisor to take action thereon, wherein the server and the construction supervision assistance apparatus displays the same XR design part as a part of the real design that is outside of the error tolerance through a visual effect, wherein the server and the construction supervision assistance apparatus display the same XR design part as a part of the real design that is outside of the error tolerance in a different color, display larger, provide a sparkling effect, or provide a blinking effect, wherein, when the supervisor takes a specific gesture, the server and the construction supervision assistance apparatus recognize the supervisor's gesture in the captured image, and determine that it is an error correction signal to perform an error correction, wherein, when the error correction signal is input, the construction supervision assistance apparatus request the error correction of the BIM design data corresponding to the checked error to the server, wherein, when error-corrected BIM design data is received from the server, the XR design for the real design is re-rendered based on the error-corrected BIM design data and displayed on the transparent display, wherein the server and the construction supervision assistance apparatus generate learning data based on the BIM design data within a certain range from the location where the checked error is occurred, and input the same in an error prediction model for deep learning, wherein, when the BIM design data of a new construction supervision target is input, the server and the construction supervision assistance apparatus analyzes the BIM design data of the new construction supervision target based on an error prediction model to predict an error occurrence location within the new supervision target, and the predicted location is provided to the construction supervision assistance apparatus.

2. The system according to claim 1, wherein the equipment line is any one of a pipeline, a cable line, and a duct line.

3. The system according to claim 2, wherein the processor is configured to perform the error correction in the manner of pushing the plurality of overlapping equipment lines away from one another in the BIM design data, but correct the plurality of equipment lines so as not to exceed a preset allowable number of equipment line inflection points.

4. The system according to claim 2, wherein the processor is configured to design all equipment lines existing in the BIM design data to have a bend of 90°, but when at least one equipment line having an angle that deviates from the bend of 90° is generated after performing the error correction of the plurality of equipment lines, the processor is configured to output a notification instructing the error correction of the at least one equipment line.

5. The system according to claim 4, wherein the processor is configured to perform the error correction in the manner of pushing the plurality of overlapping equipment lines away from one another in the BIM design data, and includes a material and purpose of use of each of the plurality of overlapping equipment lines as a correction condition, so that the determination of whether to correct the plurality of overlapping equipment lines and a pushing extent are determined in a way that minimizes design costs.

6. The system according to claim 5, wherein the processor is further configured to include, in the correction condition, an equipment line joint material cost accompanying an equipment line inflection point generated in a process of correcting the plurality of overlapping equipment lines.

7. The system according to claim 1, wherein, based on the BIM design data of the construction site and a purpose of use of the equipment line, the processor is configured to determine a material and a radius of the equipment line.

8. The system according to claim 1, wherein the processor is configured to design equipment lines in the order of equipment line installation data in which a straight-line distance between a start point and an end point is shortest, among distances of the inputted plurality of equipment line installation data.

9. A method for automatically designing an equipment line, wherein the method is performed by a system for automatically designing an equipment line, the system comprising a designing apparatus that automatically designs an equipment line, a server, and a construction supervision assistance apparatus, which is a Head-mounted display (HMD) device, wherein the construction supervision assistance apparatus comprises: a processor that controls all configurations in the construction supervision assistance apparatus; a lidar that, when a supervisor wears the construction supervision assistance apparatus, based on sensing data that emits a laser pulse and is reflected back from a target, senses a construction site in front of the supervisor and measures a distance from the supervisor of various structures; a camera that captures images; and a transparent display that is transparent and displays an eXtended reality (XR) design content, the method comprising:

providing a database with 3D-based Building Information Model (BIM) design data of the construction site, internal structure data of the construction site, and equipment data to be placed on the construction site;

receiving a plurality of pieces of equipment line installation data including a start point and an end point for equipment line installation in the BIM design data of the construction site through a user interface;

automatically designing an equipment line corresponding to each of a plurality of pieces of equipment line installation data in the BIM design data in consideration of an avoidance condition including the internal structure data of the construction site and the equipment data to be placed on the construction site, wherein when at least a portion of areas of a plurality of equipment lines overlap in a process of designing the equipment line, the apparatus for automatically designing an equipment line is configured to perform a correction in a manner of pushing the plurality of overlapping equipment lines away from one another in the BIM design data based on a radius of each of the plurality of overlapping equipment lines and a size of the overlapping areas so that the plurality of pieces of equipment line do not overlap with one another;

deriving, by the processor of the designing apparatus, based on the BIM design data of which a design of the equipment line is completed and internal structure data of the construction site, at least one reference mark installation location suitable for installation of a reference mark which is used to accurately match actual measurement data of the construction site and the BIM design data, wherein the designing apparatus derives a plurality of reference mark installation locations, and generates an image or code for each reference mark of the plurality of reference mark installation locations, wherein the image or the code for each reference mark identifies each reference mark, and the server stores the image or the code for each reference mark together with location data of each reference mark;

requesting, by the processor of the construction supervision assistance apparatus, the BIM design data of the construction site to the server, and in response, transmitting, by the server the BIM design data of the corresponding construction site to the construction supervision assistance apparatus;

transmitting, by the server, the BIM design data of the corresponding construction site, based on the captured image received from the construction supervision assistance apparatus;

capturing, by the camera of the construction supervision assistance apparatus, a direction at which the supervisor is looking;

generating, by the construction supervision assistance apparatus, a photographed image;

requesting, by the construction supervision assistance apparatus, the server to analyze the captured image;

generate, by the construction supervision assistance apparatus, the XR design content;

displaying, by the construction supervision assistance apparatus, the XR design content on the transparent display of the construction supervision assistance apparatus;

comparing, by the server and the construction supervision assistance apparatus, the BIM design data of the captured image and the XR design;

checking, by the server and the construction supervision assistance apparatus, an error of a real design of the construction site for the XR design;

when the error checked is outside a preset error tolerance, performing, by the server and the construction supervision assistance apparatus, an operation to notify the supervisor;

recognizing, by the server and the construction supervision assistance apparatus, at least one reference mark in the captured image;

checking, by the server and the construction supervision assistance apparatus, errors by matching the BIM design data of the real design and the XR design in the captured image based on the recognized reference mark;

specifying, by the server and the construction supervision assistance apparatus, the location of the checked error based on current location data of the construction supervision assistance apparatus and the location of the recognized reference mark;

when it is determined that an error greater than or equal to a predetermined reference value has occurred, performing, by the server and the construction supervision assistance apparatus, an operation to notify a supervisor, notify that the error has occurred and request the supervisor to take action thereon;

displaying, by the server and the construction supervision assistance apparatus, the same XR design part as a part of the real design that is outside of the error tolerance through a visual effect;

displaying, by the server and the construction supervision assistance apparatus, the same XR design part as a part of the real design that is outside of the error tolerance in a different color, display larger, provide a sparkling effect, or provide a blinking effect;

when the supervisor takes a specific gesture, recognizing, by the server and the construction supervision assistance apparatus, the supervisor's gesture in the captured image;

determining, by the server and the construction supervision assistance apparatus, that it is an error correction signal to perform error correction;

when an error correction signal is input, requesting, by the construction supervision assistance apparatus, an error correction of the BIM design data corresponding to the checked error to the server;

when error-corrected BIM design data is received from the server, re-rendering, by the construction supervision assistance apparatus, the XR design for the real design, based on the error-corrected BIM design data, and displaying, by the construction supervision assistance apparatus, the re-rendered XR design on the transparent display;

generating, by the server and the construction supervision assistance apparatus, learning data based on the BIM design data within a certain range from the location where the checked error is occurred, and inputting, by the server and the construction supervision assistance apparatus, the same in an error prediction model for deep learning; and when the BIM design data of a new construction supervision target is input, analyzing, by the server and the construction supervision assistance apparatus, the BIM design data of the new construction supervision target based on an error prediction model to predict an error occurrence location within the new supervision target, and providing, by the server and the construction supervision assistance apparatus, the predicted location to the construction supervision assistance apparatus.

10. The method according to claim 9, wherein the equipment line is any one of a pipeline, a cable line, and a duct line.

11. The method according to claim 10, wherein the apparatus for automatically designing an equipment line is configured to perform a correction in the manner of pushing the plurality of overlapping equipment lines away from one another in the BIM design data, but correct the plurality of equipment lines so as not to exceed a preset allowable number of equipment line inflection points.

12. The method according to claim 11, wherein the apparatus for automatically designing an equipment line is configured to design all equipment lines existing in the BIM design data to have a bend of 90°, but when at least one equipment line having an angle that deviates from the bend of 90° is generated after performing a correction of the plurality of equipment lines, the processor is configured to output a notification instructing a correction of the at least one equipment line.

13. The method according to claim 12, wherein the apparatus for automatically designing an equipment line is configured to perform a correction in the manner of pushing the plurality of overlapping equipment lines away from one another in the BIM design data, and includes a material and purpose of use of each of the plurality of overlapping equipment lines as a correction condition, so that the determination of whether to correct the plurality of overlapping equipment lines and a pushing extent are determined in a way that minimizes design costs.

14. The method according to claim 13, wherein the apparatus for automatically designing an equipment line is further configured to include, in the correction condition, an equipment line joint material cost accompanying an equipment line inflection point generated in a process of correcting the plurality of overlapping equipment lines.

15. The method according to claim 9, wherein, based on the BIM design data of the construction site and a purpose of use of the equipment line, the apparatus for automatically designing an equipment line is configured to determine a material and a radius of the equipment line.

16. The method according to claim 9, wherein the apparatus for automatically designing an equipment line is configured to design equipment lines in the order of equipment line installation data in which a straight-line distance between a start point and an end point is shortest, among distances of the inputted plurality of equipment line installation data.

17. A non-transitory computer readable recording medium on which a program for performing the method of claim 10 is stored in combination with a computer that is hardware.

* * * * *